I| United States Patent
Merold et al.

(10) Patent No.: US 10,102,577 B2
(45) Date of Patent: Oct. 16, 2018

(54) METHOD AND APPARATUS FOR ORDER ENTRY IN AN ELECTRONIC TRADING SYSTEM

(71) Applicant: NEX Services North America LLC, NY, NY (US)

(72) Inventors: Michael Merold, Sparta, NJ (US); John E. Schoen, Jersey City, NJ (US)

(73) Assignee: NEX Services North America LLC, New York, NY (US)

( * ) Notice: Subject to any disclaimer, the term of this patent is extended or adjusted under 35 U.S.C. 154(b) by 247 days.

(21) Appl. No.: 14/481,022

(22) Filed: Sep. 9, 2014

(65) Prior Publication Data

US 2015/0073970 A1 Mar. 12, 2015

Related U.S. Application Data

(60) Provisional application No. 61/875,263, filed on Sep. 9, 2013.

(51) Int. Cl.
*G06Q 40/04* (2012.01)
*H04L 12/861* (2013.01)
*G06Q 30/08* (2012.01)
*H04L 12/863* (2013.01)
(Continued)

(52) U.S. Cl.
CPC .............. *G06Q 40/04* (2013.01); *G06Q 30/08* (2013.01); *H04L 47/10* (2013.01); *H04L 47/50* (2013.01); *H04L 47/6255* (2013.01); *H04L 49/90* (2013.01); *H04L 2012/5681* (2013.01)

(58) Field of Classification Search
USPC ..................................................... 705/37, 35
See application file for complete search history.

(56) References Cited

U.S. PATENT DOCUMENTS

| 5,375,055 A | 12/1994 | Togher et al. |
| 5,983,308 A | 11/1999 | Kerstein |
| 6,014,627 A | 1/2000 | Togher et al. |

(Continued)

FOREIGN PATENT DOCUMENTS

| EP | 1777655 A1 | 4/2007 |
| EP | 2509041 A2 | 10/2012 |

(Continued)

OTHER PUBLICATIONS

"HFT Platforms facing Speed Limits", S. Foley, Financial Times, Apr. 29, 2013.

(Continued)

*Primary Examiner* — William E Rankins
(74) *Attorney, Agent, or Firm* — Arent Fox LLP

(57) ABSTRACT

Orders received by an electronic trading system are processed in batches based on the instrument to which an order relates. An incoming order is assigned to a queue of a queue set that makes up the batch according to a random process. Where orders are received from related trading parties they are assigned to the same queue set according to their time of receipt. The batch has a random duration within defined minimum and maximum durations and at the end of the batch, the orders held in the queues are transferred to a matching thread of the trading system sequentially with one order being removed from each queue and a number of passes of the queues completed until orders have been removed.

23 Claims, 12 Drawing Sheets

(51) Int. Cl.
*H04L 12/70* (2013.01)
*H04L 12/801* (2013.01)

(56) References Cited

U.S. PATENT DOCUMENTS

| | | | |
|---|---|---|---|
| 6,047,000 | A | 4/2000 | Tsang et al. |
| 6,603,772 | B1 | 8/2003 | Moussavi et al. |
| 6,996,541 | B2 | 2/2006 | Togher et al. |
| 7,461,026 | B2 | 12/2008 | Schluetter |
| 7,469,324 | B2 | 12/2008 | Tene et al. |
| 7,660,760 | B2 | 2/2010 | Zubairi |
| 7,752,115 | B2 | 7/2010 | Schluetter |
| 7,840,474 | B1 | 11/2010 | Tari et al. |
| 8,069,138 | B2 | 11/2011 | Tully et al. |
| 8,166,182 | B2 | 4/2012 | Crouch |
| 8,170,940 | B2 | 5/2012 | Tully et al. |
| 8,315,187 | B1 * | 11/2012 | White ............... H04L 47/6205 370/254 |
| 8,341,071 | B2 | 12/2012 | Bartko et al. |
| 8,370,251 | B2 | 2/2013 | Schluetter |
| 2004/0090974 | A1 * | 5/2004 | Balakrishnan ...... H04L 12/5693 370/412 |
| 2004/0093300 | A1 * | 5/2004 | Burns .................... G06Q 40/04 705/37 |
| 2006/0259397 | A1 | 11/2006 | Schluetter |
| 2006/0294228 | A1 | 12/2006 | Almstrom |
| 2010/0228644 | A1 | 9/2010 | Schluetter |
| 2012/0005066 | A1 | 1/2012 | Keith et al. |
| 2012/0022999 | A1 | 1/2012 | Bartko et al. |
| 2012/0084191 | A1 | 4/2012 | Mintz |
| 2012/0246052 | A1 | 9/2012 | Taylor et al. |
| 2013/0006828 | A1 | 1/2013 | Dale et al. |
| 2013/0013487 | A1 * | 1/2013 | Sellberg ................ G06Q 40/06 705/37 |
| 2013/0297478 | A1 * | 11/2013 | Mannix ................ G06Q 40/04 705/37 |
| 2015/0006349 | A1 * | 1/2015 | Eddy ..................... G06Q 40/04 705/37 |
| 2015/0127519 | A1 | 5/2015 | Melton | |

FOREIGN PATENT DOCUMENTS

| | | |
|---|---|---|
| WO | WO-93/15467 A1 | 8/1993 |
| WO | WO-2010-085746 A1 | 7/2010 |

OTHER PUBLICATIONS

"High Frequency Foreign Exchange Traders Targetted in new speed limit proposals", FXStreet.com (Web), Apr. 29, 2013.
"HFT Platforms Facing Speed Limits", City AM, Apr. 29, 2013.
Budish, Eric et al.; "Implementation Details for Frequent Batch Auctions: Slowing Down Markets to the Blink of an Eye"; American Economic Review: Papers & Proceedings 2014, vol. 104, No. 5, May 2014, pp. 418-424.
Budish, Eric et al.; "The High-Frequency Trading Arms Race: Frequent Batch Auctions as a Market Design Response"; Feb. 10, 2014.
Farmer, J. Doyne; "Review of the benefits of a continuous market vs. randomised stop auctions and of alternative Priority Rules (policy options 7 and 12)"; European Commission Public Consultation: Review of the Markets in Financial Instruments Directive; Mar. 28, 2012, 25 pages.
Foley, Stephen; "HFT platforms facing speed limits"; Precise, www.precise.co.uk., Financial Times, Apr. 29, 2013, 1 page.
Harris, Larry; "What to Do about High-Frequency Trading"; Financial Analysts Journal, CFA Institute, Mar./Apr. 2013, pp. 1-27.
Jones, Charles M. et al.; "What do we know about high-frequency trading?"; Columbia Business School, Version 3.4, Mar. 20, 2013, 56 pages.
Onstad, Eric et al.; Analysis: 'Slow frequency' technology faces tough shift from FX to stock markets; printed from http://www.reuters.com/article/2013/10/02/us-hft-curbs-analysis-idUSBRE9910PJ20131002, Oct. 2, 2013, 6 pages.
Szalay, Eva; "Life in the Slow Lane"; printed from http://www.automatedtrader.net/articles/exchange-views/144193/life-in-the-slow-lane, Automated Trader Magazine, Issue 30, Q3 2013, 3 pages.

* cited by examiner

FIG. 4

METHOD AND APPARATUS FOR ORDER ENTRY IN AN ELECTRONIC TRADING SYSTEM

CROSS REFERENCE TO RELATED APPLICATION

The present application claims priority to Provisional Application 61/875,263 filed Sep. 9, 2013.

FIELD OF THE INVENTION

This invention relates to electronic trading systems. It is particularly concerned with the entry of orders placed by traders or brokers into such trading systems.

BACKGROUND TO THE INVENTION

Over the last twenty years, electronic trading systems have become commonplace in the financial markets for trading a wide variety of instruments such as equities, foreign exchange (FX) products, commodities and derivatives as well as fixed income products and many other financial instruments.

Many types of electronic trading systems exist, using different trading models. Examples include RFQ (Request for Quote) based systems, anonymous matching systems and auction based systems. An example of anonymous matching system is disclosed in U.S. Pat. No. 6,996,541 Togher et al, the content of which is incorporated herein by reference. Togher describes a distributed matching system in which traders connected to the system through a communications network submit orders into the system to buy or sell financial instruments. Maker orders are displayed to other traders on the system who can respond to those orders with their own orders which will be matched with the visible maker orders in accordance with matching rules to execute a trade. Typically, the system will receive maker orders from all parties and construct an order book based, for example, an order price and time of order receipt. For ease of interpretation only the best order or best few orders will be displayed to other traders on their screens and counterparty traders respond to the best orders they see.

Many trading systems are based on a centralised host computer which matches incoming maker and taker orders, maintains order books and administers credit limits. The host computer may also be responsible for distributing market related data, generating deal tickets after a trade has been executed and maintaining records of activity on the system. Some trading systems such as that described in Togher et al mentioned above, operate as a distributed model in which the matching engine is split into a number of separate matching engines. This approach is attractive in a global trading system where latency issues can affect the fairness of access to a centralised system from different parts of the world. The Togher distributed system, as implemented by ICAP Plc in its EBS trading platform, has a number of matching engines each located geographically in a main financial market. As these markets operate at different times of the day, many of the trades will be between parties who are operating in the same geographical region and the matching may be performed locally at the regional matching engine. Other trades may involve two separate matching engines in two separate geographical regions. An example would be a trade conducted in the afternoon in London between a London based trader and a New York based trader where it is the morning and the markets are open.

Latency issues are present in any system which connects parties over large distances. The distributed architecture goes some way to addressing latency issues. Fairness issues are of concern and distributed systems provide improved fairness compared to centralised systems. However, the rise of algorithmic trading has highlighted latency issues. Algorithmic trading, also known as High Frequency Trading (HFT), replaces human traders with electronic platforms which enter orders automatically in accordance with a trading algorithm. The orders are generated in response to received market data such as the price or size of orders in the market. In a distributed system such as the EBS system, market views are sent to each trading entity, such as a bank's trading floor, periodically giving that trading entity an update of the market book. These market views are distributed in turn to each floor giving the first trading floors that receive market views a slight advantage over floors that receive the views later, and in particular over the last trading floor to receive the market update. Latency issues caused by the relative proximity of the trading floors to the computers distributing the market views can exacerbate this advantage. This problem is dealt with, to an extent, by the distribution method and apparatus disclosed in U.S. Pat. No. 8,446, 801 (Howorka et al) the contents of which are incorporated by reference. Howorka introduces a random component into the order in which market updates are distributed so that the time at which a given trading floor receives market data relative to other trading floors gradually changes over time. This approach goes some way to evening out unfairness over time.

Thus, known electronic trading systems have utilised some measures to address latency issues and to address unfairness in access to the system. However, they are unable to deal with discrepancies in the speed at which parties trading on the system can enter orders into the system. This is an issue which is largely out of the control of the trading system operator. In view of the speed at which many financial markets operate, there is a strong motivation for trading entities such as hedge funds and banks to invest heavily in hardware, software and communications technology that will ensure their orders reach the trading system as quickly as possible. This approach requires heavy financial investment on behalf of the trading entities and introduces a strong element of unfairness in that it gives an advantage to the larger entities which are more able to make the investment required. The problem can be less severe on systems that operate on a private communications network but worse on systems that use a public network such as the Internet for communications between the trading entities and the trading system.

U.S. Pat. No. 7,461,026 assigned to Trading Technologies, Inc attempts to address this problem. Market data is sent from a host system to client devices through synchronised local communication services so that data can be displayed simultaneously or near simultaneously at each client device. Transaction data sent from the client devices to the host system is also received via the local communication servers and the ordering of that transaction data is based, at least in part, on when the local communication servers received the transaction data from the client devices. The transaction data may include order information and the transaction messages may be prioritised by determining a travel time from a first network device to the host exchange and then determines a similar travel time for a second device. When a transaction message is sent from a first client device the receipt time is determined. Similarly, the receipt time of messages from the second device is measured and the host system can then use the known travel times for the two devices to prioritise the first and second transaction messages at the host exchange.

While this approach goes someway to addressing the issue, it is complex and relies on a fore-knowledge of travel times and a constancy of travel time for repeated transactions from the same device. The approach may not be able to cope well with orders submitted from mobile devices such as tablets or phones which are beginning to be used in the markets as travel time will vary depending on the location of the device.

There is, therefore, a need for an improved approach to the problem of fairness in order entry into electronic trading systems.

SUMMARY OF THE INVENTION

One aspect of the invention provides a computerised method for submission of orders to an electronic trading system for matching. Electronic order messages for trading an instrument are received at a server of said electronic trading system from parties trading on the electronic trading system. A message batch is initiated, the message batch having a defined duration. Received electronic order messages are stored in a storage device of the server such as a memory. The orders are stored in said storage device in an order unrelated to the order in which they were received at the electronic trading system. After expiry of the defined duration of the batch, the stored order messages are submitted to a matching engine of the electronic trading system in the order in which they are stored in the storage device.

By submitting stored order messages to the matching engine in an order unrelated to the order in which they were received at the electronic trading system, the importance of the transmission path between the parties and the electronic trading system is reduced. This in turn de-emphasises the need for highly sophisticated systems for ensuring the fastest possible order submission from the trading floors at which the parties on the system on reside to the electronic trading system. Thus, fairness of access to the system is increased by increasing the likelihood that smaller participants will have their orders matched even if they were submitted using less sophisticated systems than orders submitted by larger institutions.

In one embodiment of the invention, on receipt of an order message, the origin of the order message is determined. A determination is made whether another order message from the same origin is stored in the storage device for the batch and, if another such message is stored, the message is queued behind the earlier stored message, whereby on expiry of the batch duration, the earlier stored message from the same origin is sent for matching ahead of the later received message from the same origin.

The origin of the message may comprise a group of related trading floors and the origin of the earlier and later received messages may be compared to determine whether they are from the same group of trading floors.

In one embodiment of the invention, the order in which the order messages are stored in the storage device is randomised.

In one embodiment of the invention, the duration of the batch is randomised within a predetermined maximum and minimum length.

In one embodiment of the invention, the electronic trading system trades a plurality of instruments and a message batch includes order messages relating to the same instrument.

The step of initiating a message batch may comprise examining a received electronic order message to determine to which instrument it relates and assigning the message to an appropriate batch that relates to the determined instrument.

The first aspect of the invention also provides a computerised trading system for matching orders submitted by trading parties. The computerised trading system comprises an order entry system having a server for receiving from parties trading on the electronic trading system, electronic order messages for trading an instrument. The server is configured to initiate a message batch having a defined duration. The server comprises a storage area or memory for storing the received electronic order messages. The storage area stores the electronic order messages in an order unrelated to the order in which they were received at the server. The server is further configured to submit the stored order messages, after expiry of the defined duration, to a matching engine forming part of the electronic trading system, in the order in which they are stored in the storage device.

The first aspect of the invention also provides a non-transitory tangible computer readable medium comprising computer-executable instructions that, when executed on a computerised trading system, cause the computerised trading system to initiate at a server computer of the computerised trading system a batch having a defined duration, the batch comprising a set of queues; to receive, at the server computer, from parties trading on the electronic trading system, electronic order messages for trading an instrument, to assign the received message to a random queue within the set of queues; and at the end of the defined duration of the batch, to transfer messages sequentially from each of the set of queues to a matching function of the electronic trading system.

A second aspect of the invention resides in a computerised method for submission of orders to an electronic trading system for matching. A batch having a defined duration is initiated at a server computer. The batch comprises a set of queues. At the server, electronic order messages for trading an instrument are received from one or more parties trading on the electronic trading system. Each received message is assigned to a random queue within the set of queues. At the end of the defined duration of the batch, messages are transferred sequentially from each of the set of queues to a matching function of the electronic trading system.

In one embodiment, the received order messages include an indication of the identity of the originating party. A determination is made at the server of the virtual floor code of the party submitting the received message, the virtual floor code being an identity of a group of related parties trading on the system.

The virtual floor code of the received message may be compared with the virtual floor codes of any messages already assigned to the queues of the batch. If the virtual floor codes match, the new message is assigned to the same queue as the earlier message with the same virtual floor code.

The new message may be assigned to the same queue as the earlier message having the same virtual floor code at a position behind the earlier message such that the earlier message is sent to the matching function before the new message.

In one embodiment, the step of assigning the received message to a random queue comprises selecting a random queue, determining whether that queue has a message already assigned to it and, if it has, assigning the message to the next empty queue. In the absence of any empty queues, the message is preferably assigned to the original randomly assigned queue.

Preferably, message information may be attached to the message after it has been assigned to a queue. The message information may include at least one of a batch number, message time of receipt, message number within the batch and assigned queue number.

In one embodiment of this aspect of the invention, if the message is the first message received in a batch, a timer may be initiated having a random duration between defined minimum and maximum durations, the random duration being said defined duration of the batch.

In one embodiment, the steps of receiving, initiating and storing are performed by a routing thread of said server computer. The server further has a matching thread for performing the submitting step, the matching thread cycling through the queues sequentially to remove and process messages from the queues one at a time. Preferably, the matching thread may add the time at which a message was moved from the batch to the message.

The second aspect of the invention also provides a computerised trading system for submission of order to trade instruments for matching. The system comprises an order entry system including a server computer which is configured to initiate a batch having a defined duration. The batch comprises a plurality of queues and relates to an instrument of a plurality of instruments traded on the electronic trading system. The server is configured to receive, from parties trading on the electronic trading system, electronic order messages for trading the plurality of instruments. The server is configured to assign a received message to the batch to which the instrument relates and to a random queue within the set of queues forming the assigned batch. The server is further configured to transfer messages, at the end of the defined duration of the batch, sequentially from each queue of the set of queues to a matching function of the electronic trading system.

The second aspect of the invention also provides a non-transitory tangible computer-readable medium comprising computer-executable instructions that when executed on an electronic trading system cause the trading system to receive at a server of the electronic trading system, from parties trading on the system, electronic order messages for trading an instrument; to initiate a message batch having a defined duration and; to store electronic order messages in a storage device such as a memory of the server. The orders are stored in the storage device in an order unrelated to the order in which they were received at the electronic trading system. After expiry of the defined duration of the batch, the stored order messages are submitted to a matching engine of the electronic trading system in the order in which they are stored on the storage device.

BRIEF DESCRIPTION OF THE DRAWINGS

Embodiments of the invention will now be described, by way of example only, and with reference to the accompanying drawings, in which:

FIG. 4 is a screen shot illustrating the user interface presented to a manual trader on a trader workstation;

DESCRIPTION OF PREFERRED EMBODIMENTS

In the embodiment illustrated in the Figures, the trading system is an electronic brokerage system for facilitating the buying and selling of financial instruments such as foreign exchange (FX) spot products or precious metals. Although the present invention is described in the context of FX Spot and metals trading the invention is not linked to the trading of any particular financial instrument and is applicable to trading of any financial instrument including, but not limited to, foreign exchange products, precious metals, equities, derivatives, commodities, cash instruments, securities, long and short term debt and repurchase agreements. Moreover, the invention is not limited to the trading of financial or non-financial products and is applicable to any system in which the relative time of access to a computer system is important.

The system to be described is an anonymous distributed trading system. Again, the invention is not limited to any particular system architecture and may be used with a host based system such as that of U.S. Pat. No. 7,461,026 or any other system architecture. An anonymous system is one in which the identity of the parties to a trade is not known to the participants until a trade has been agreed. The invention may also be used in systems which are not anonymous. In the Togher system referred to above, and the system described herein, firm orders are submitted for execution. These orders will be dealt unless the order fails to meet one of a number of predetermined criteria such as the availability of sufficient credit for the trade at one of the potential parties to the trader. However, the invention is not limited to systems which submit firm orders for execution and may be used with any other order entry system including systems which operate on the basis of RFQs or in which matches are negotiated between parties following an initial identification of a possible match.

Figure 1:
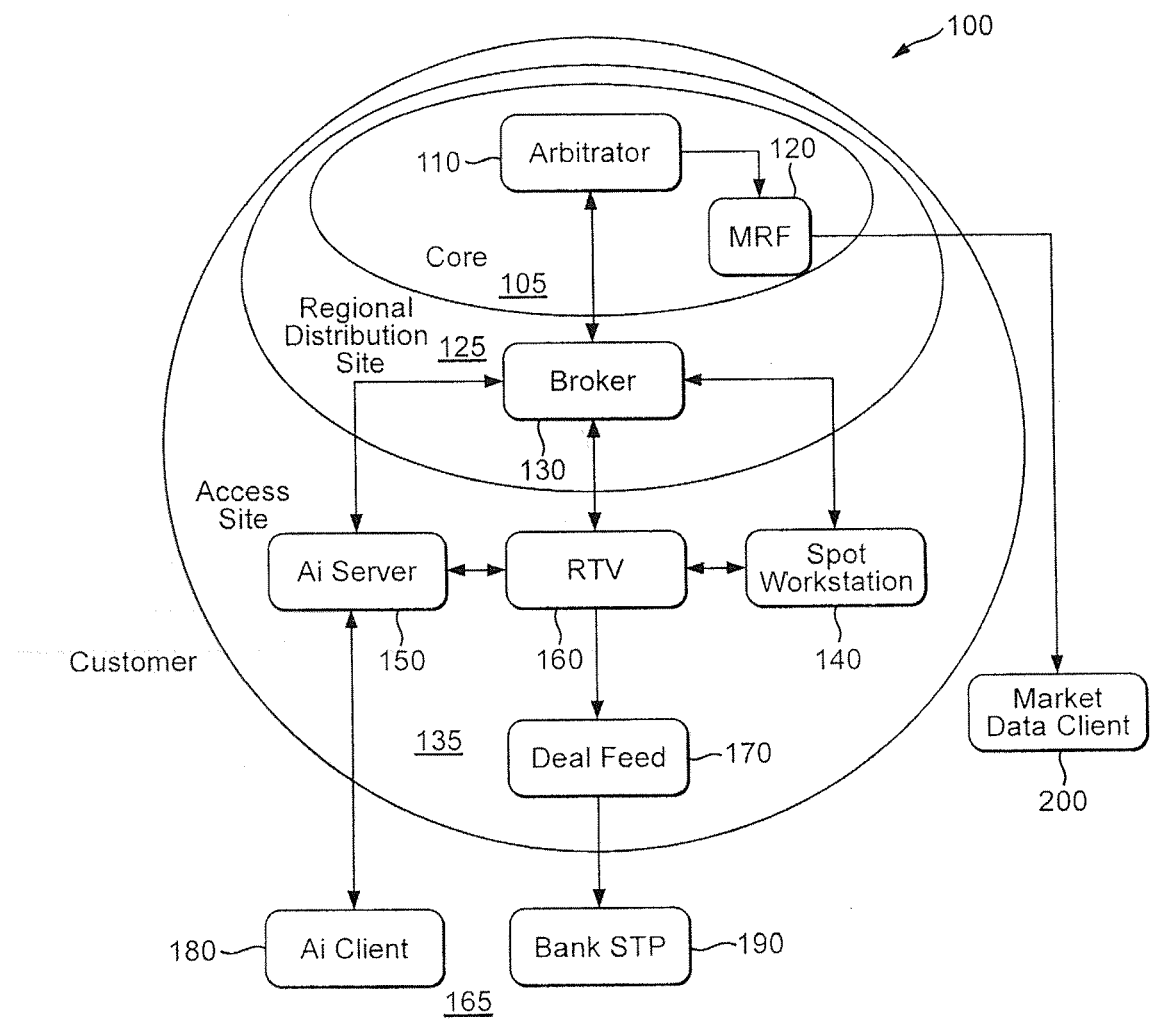
FIG. 1 illustrates, schematically, an example of a known distributed electronic trading system.

Referring to FIG. 1, the trading system illustrated is similar to that described in U.S. Pat. No. 6,996,541 referred to above and incorporated herein by reference. The system 100 may be broken into a four tier hierarchy with a network of arbitrators 110 at the top of the hierarchy and forming the core 105 of the system. The arbitrators are servers or clusters of servers and function as the matching engines and are responsible of maintaining order books and matching bids, offers, hits and takes to execute trades or deals. For ease of understanding, FIG. 1 shows a single component in each tier of the hierarchy. In practice there are several arbitrators as will be described and then multiple components at each tier connecting to each of the components at the tier above. The matching engines, or arbitrators, have a global view of the market and facilitate global liquidity. The core tier also supports centralised transactional persistence and analysis and includes a market rate feed element MRF 120 which can send market data to subscribers.

The second tier 125 comprises a plurality of brokers 130 which form a regional distribution site. The brokers manage interactions between the arbitrators and trader workstations. Each broker represents a group of trading floors to the arbitrators and each broker has a database which persists the floor-specific configuration settings and deal history. These configurations will include credit data comprising the credit limits extended by a given trading floor to all other possible counterparty trading floors. The credit limits include a yes/no matrix of credit which is used to screen market information received from the arbitrators. As a result, the view of the market that is sent to each trading floor is individually tailored to show only those counterparty orders from parties to whom the trading party has extended credit and vice versa. Brokers are typically located in major cities, some of which will also have arbitrators.

The third tier 135 is the bank access floor which comprises trader workstations 140. Trader workstations are used by manual traders to communicate with the arbitrators via their dedicated broker. The workstation comprises a standard PC or other computer with a display that shows the trader his or her trading floor's view of the market and allows the trader to trade by submitting visible (bid or offer) or invisible (hit or take) orders into the market using an input device such as a keyboard or a mouse. Typically, traders will use a dedicated trading keypad which is designed for swift and efficient order entry. Also at the access site level is an AI (Automated Interface) server 150 which is a trading floor based server that supports automated trading by exposing an XML interface to the trading system. The workstations 140 and the AI server 150 both communicate directly with their dedicated broker and also with RTV (Real Time View) servers 160 which also reside on a bank or institution trading floor. The RTV servers manage efficient floor-wide data caching and aggregation and communicate with a deal feed server 170 to deliver completed deal information in the form of deal tickets. The deal feed server 170 is responsible for communicating that information to banks' and institutions' deal processing systems for settlement of trades the bank or institution has entered into.

The fourth tier 165 of the system is the customer site. Physically, this tier may be at the same location as the access floor of tier 3, but architecturally it exists outside the trading system firewall. Components in this include customer pricing engines, risk management handlers, STP (straight through processing) processors, market data clients and model trading clients. In the figure model trading clients are shown as AI client 180 which communicates via the AI server 150 to place orders generated by the customer's trading algorithms into the market. The bank STP system 190 receives trade ticket data from the deal feed servers 170 to enable reconciliation of the institution's trading activities as the system and settlement of its trading liabilities. The market view client 200 communicates with the market rate feed 120 to provide market data, such as benchmarks and historic rate information to customers.

Figure 2A:
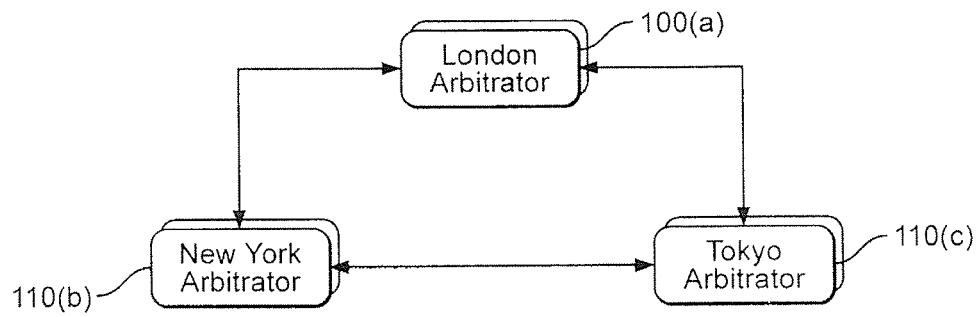
FIGS. 2a and 2b illustrate the arbitrator network in the system of FIG. 1.
Figure 2B:
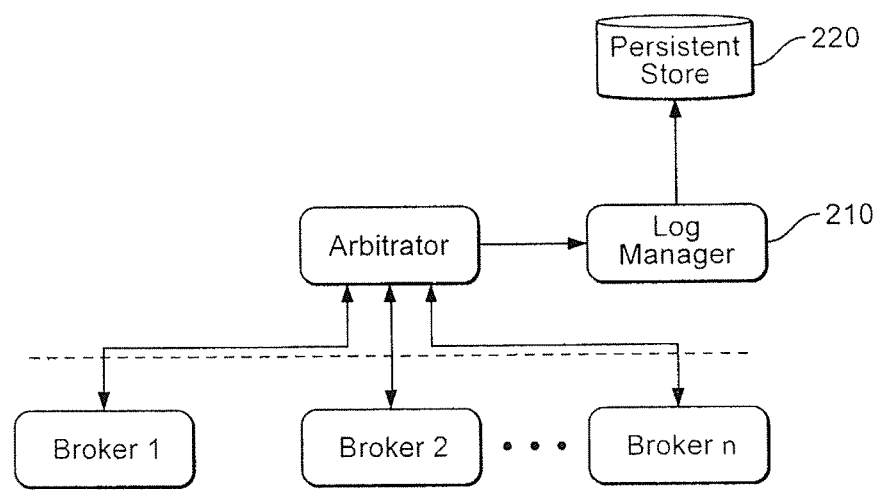

FIGS. 2a and 2b illustrate the arbitrator network. In this example, there are three arbitrators linked to one another and located in different trading regions with arbitrator 110(a) in London, arbitrator 110(b) in New York and arbitrator 110(c) in Tokyo. Of course a system could use a different number of arbitrotors. Although not shown, each arbitrator has a stand-by back-up arbitrator in case of failure of the main arbitrator. As will be appreciated from FIG. 1, different trading entities will submit orders via their respective brokers to different arbitrators depending on their geographical location. The three active arbitrators are constantly synchronised so that orders submitted in a single region are near-instantly available globally. This architecture achieves the performance advantages of a local market while maintaining global liquidity. As well as maintaining the global order book and the credit books for its region, the arbitrator proposes deals by matching credit compatible invisible orders (hits and takes) with visible quotes (bids and offers). The arbitrator also distributes market data to other arbitrators and downstream components such as brokers.

Transactions from each arbitrator are synchronously persisted in redundant log files. As illustrated in FIG. 2(b) each of the arbitrators 110 is connected to a plurality of brokers 130(i) to 130(n) and also to a log manager server 210 and a persistent storage device 220. This guarantees that no transactional data is ever lost. Transactional data is also passed to the market rate feed system 120 in real time for analysis and archiving.

The brokers 130 which sit between the trading floors and the arbitrators are each an electronic agent which represents a trading floor to the trading system. Trading floor configuration settings, including entitlements, credit limits and settlement instructions are persisted in a database which is associated with each broker. These settings may be adjusted by a trading floor administrator (TFA) who has rights to set variables such as credit limits on behalf of a trading floor. A trading floor consists of one or more manual or automated traders or a mixture of both, although as seen from FIG. 1, the automated terminals access the broker via the AI server 150. The brokers construct market views for each trading floor based on stored credit information and disseminate these market views and news to the trading floors. The brokers also manage the life cycle of orders and deals for each of their floors. During the trade negotiation process, when a match has been made by the arbitrator, the brokers handle the final credit checking process which will determine whether a deal can proceed and, if so, whether the amount of the deal needs to be reduced if there is not sufficient credit for the entire amount of the deal. The brokers also store and exchange settlement instructions for their floors and for counterparty floors. Thus, the brokers perform the roles of access control, market view calculation and distribution, order/deal lifecycle management, credit management, news distribution, enforcement of system dealing rules and trading floor configuration management.

A single broker represents a number of trading floors in its geographical proximity. Some brokers are located at the same places as arbitrators, although this need not be the case, as well and in other centres which have high concentrations of trading floors, such as Zurich and Singapore. As with the arbitrators, each has a mirror which provides for disaster recovery.

Figure 3:
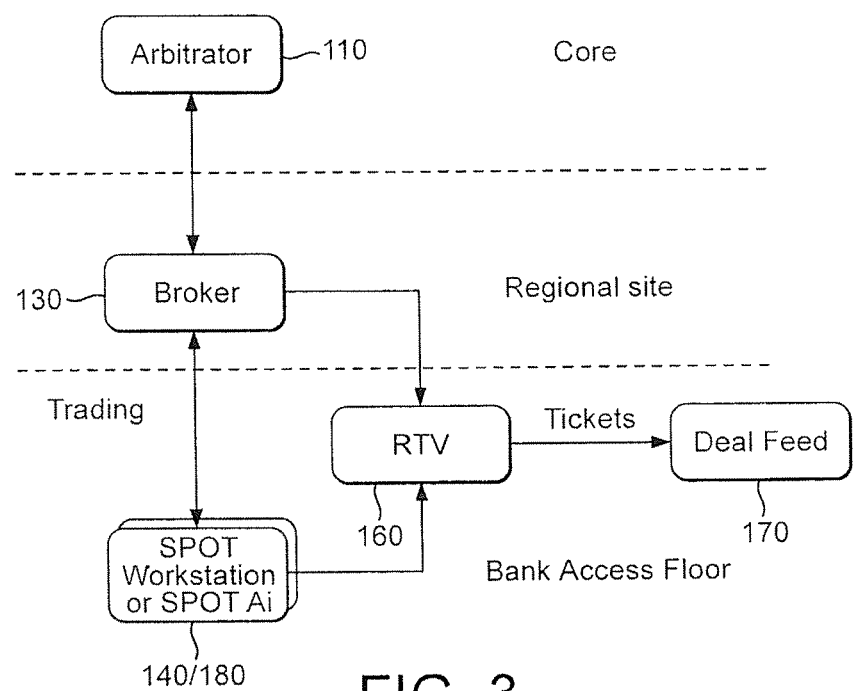
FIG. 3 illustrates the Real Time View Server.

The real time view server 160 is illustrated in FIG. 3 and exists locally on a bank floor. Thus, each trading floor on the system has a real time view server 160. The RTV conserves network traffic and enhances the speed and scalability of the system. The server is trading floor based and performs floor wide services for the trading entities including both the trader workstations and the AI servers on its floor. These servers include data aggregation, caching and distribution. The RTV is also responsible for delivery of completed deal information to the deal feed server 170 on its floor.

Figure 4:
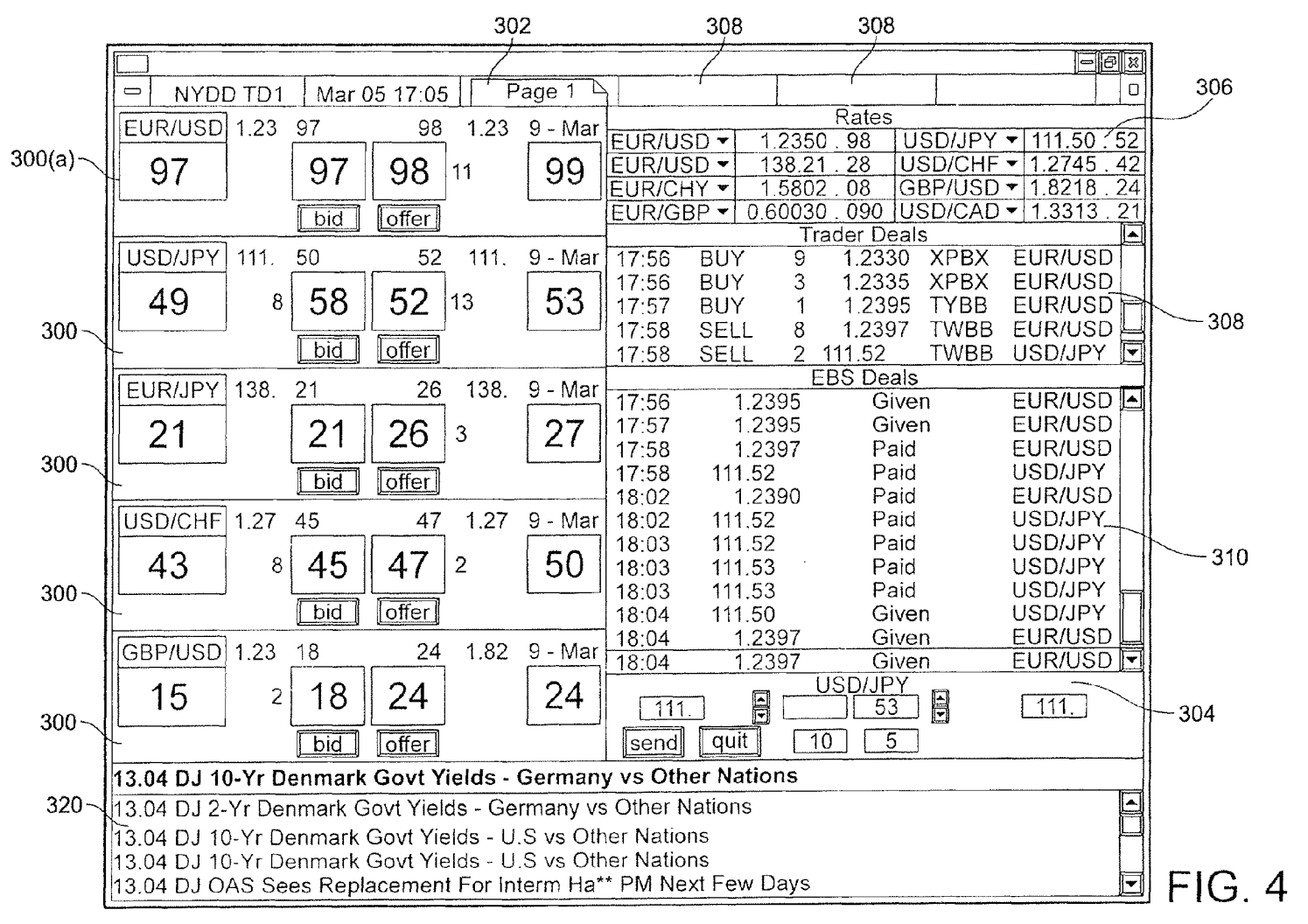

The workstations used by manual traders provide traders with an intuitive graphical user interface such as that illustrated in FIG. 4. This allows a trader to tailor the trading environment to their particular style of trading and instruments the trade. The essence of the display is a series of price panels 300 which illustrate the market in a series of instruments available to the trader. The trader can select from a plurality of pages of panels via a page tab 302 and can select which panels appear on which page. The price panels each show the current system-wide best price for both bid and offer as well as the best dealable price, which is the best price that is available to that trader to deal. This price may not be as good as the system best price if, for example, the trader's institution has not extended credit to the owner of the best price in the system.

At the bottom right hand side of the display is a quote panel 304 which enables traders to submit bids and offers. The quote panel is linked to the active price panel 300(*a*) which in this case is the USD/JPY currency pair. A trader can click on any other price panels to make that the current active panel in which case the quote panel will display the parameters of that currency pair and enable quote entry for the market in that currency pair. At the upper right hand side of the display is a rates panel 306 which lists the best rates that are available on the system for all available instruments irrespective of whether the trader has credit to deal those prices. Above the trade panels are two credit warning panels 308 which show warning messages to traders indicating that credit levels are reaching predetermined levels with certain counterparties or groups of counterparties. The colour of the warnings may vary according to the severity of the warning. A red message may, for example, indicate the imminent expiry of credit. Underneath the rates panel 306 is a trader deals panel 308 which shows all deals that the trader has executed. This is the trader's blotter and provides a convenient view of the trader's position enabling easy trading.

Beneath the trader deals panel 308 is a system deals panel 310. This panel shows all deals that have been successfully executed on the system in selected currency pairs. The panel only identifies the currency pair, the time of the deal, the rate and whether the deal was paid or given. It does not identify the parties to the deals. In contrast, the trader deals panel additionally shows the amount of a deal and the four letter floor code of the counterparty.

Underneath the active panels described is a news panel 320 which displays worldwide financial events that may be of interest to the trader and affect their trading strategy.

In addition to providing an interface between traders and the trading system, the trader workstation provides validation of orders input by traders, data management and aggregation, quote interrupt management enabling traders to withdraw quotes entered into the market before they are dealt, trader profile customisation and printing of deal tickets.

Figure 5:
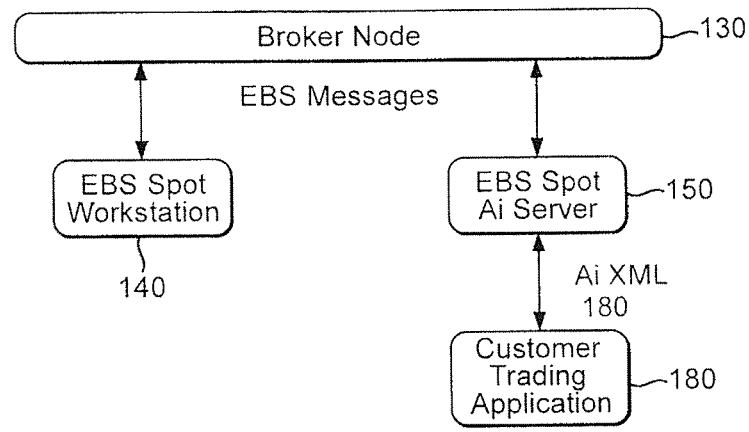
FIG. 5 illustrates communications between manual and automated trader and the system.

FIG. 5 illustrates the automated trading interface and shows how customer trading applications or AI clients 180 communicate with the trading system via a floor based AI server which in turn communicates with that floors assigned broker. The AI server 150 provides for direct integration between a customer's trading engine and the system and may be used to run mathematical models, arbitrage models or risk management models.

Thus, the AI server intermediates between the AI client and the trading system. Architecturally, the server may be similar to the trader workstation except that the AI server translates from an XML or similar messaging protocol to the system protocol, whereas the trader workstation intermediates between a GUI and the system trading messages. The AI server, similar to the trader workstation, also performs the tasks of user authentication and input validation. XML messages are validated both for conformance to the XML protocol and for compliance with system dealing rules. Moreover, a throttle may be included to restrict the number of transactions that may be imitated by a single automated client to prevent the system becoming overloaded.

Figure 6:
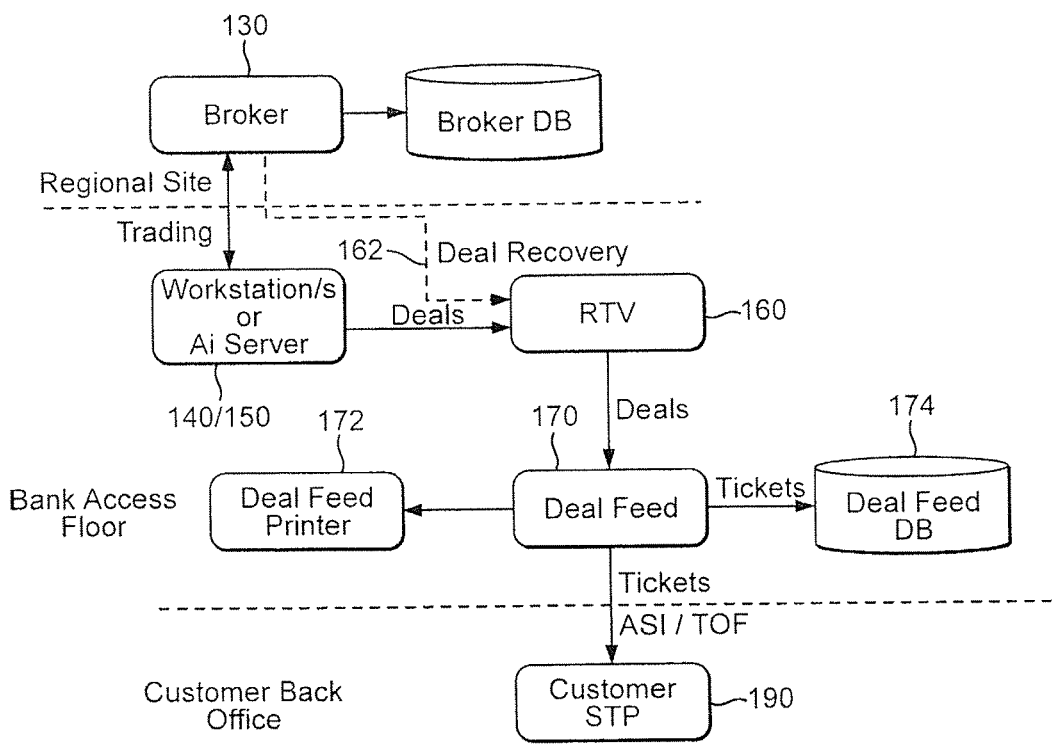
FIG. 6 shows how deal tickets are handled by the system.

The deal feed component 170 is illustrated in FIG. 6 and delivers automatically post-deal information to the client's internal systems for position keeping, risk management and trade settlement. Deal tickets may be produced in one of a number of industry standards at the selection of the trading floor administrator. These formats include Reuters TOF (Ticket Output Feed Format) and EBS ASI (Automated System Interface). Deal tickets may also be printed locally. The deal feed arrangement is shown in FIG. 6 which shows the deal feed server 170 on each trading floor attached to a printer 172 and at deal feed database 174 as well as the customer STP 190. The deal feed server receives deal information from the Real Time View component RTV 160 which in turn receives deal information from the trader or AI workstation 140 or 180. The deal feed server resides on a bank's trading floor to minimise post-trade latency to the customer STP system. A dotted line 162 is shown between RTV 160 and the broker 130 indicating a deal recovery protocol between the RTV and the broker which can be activated automatically if there is a component disconnect in one of the components that participates in ticket delivery. The deal feed repository 174 is a database which stores tickets and supports deal query and ticket recovery in case of an outage in the customer's STP application.

At the core of the system 105, a market rate feed 120 receives data directly from an arbitrator and calculates various market data from the real-time data feed. This data is then distributed to market data clients 200. The market data may include a spot market data feed, spot prices for the currency pairs traded on the system and historical market data.

Figure 7:
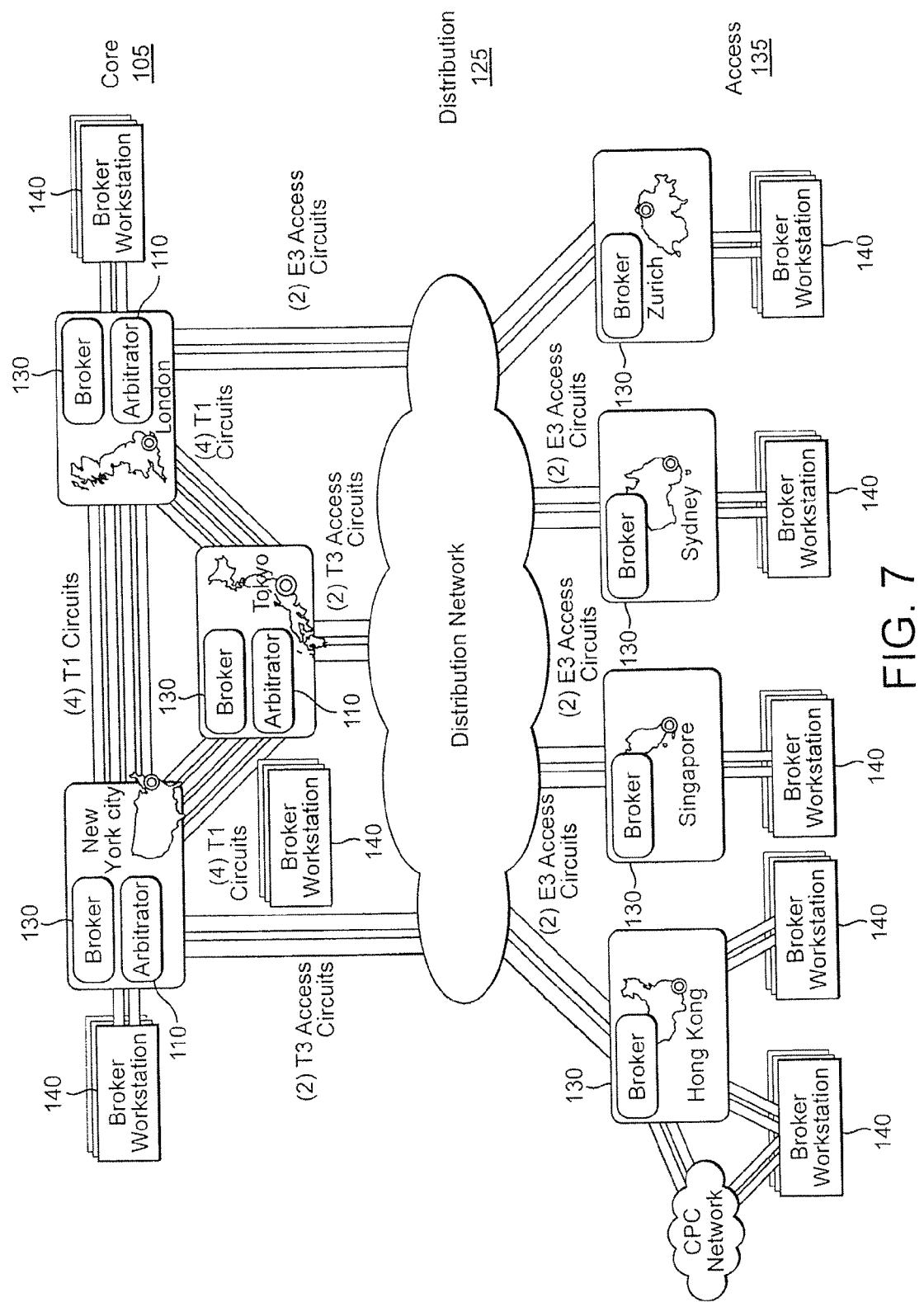
FIG. 7 shows an overview of the communications network linking components of the system.
Figure 8:
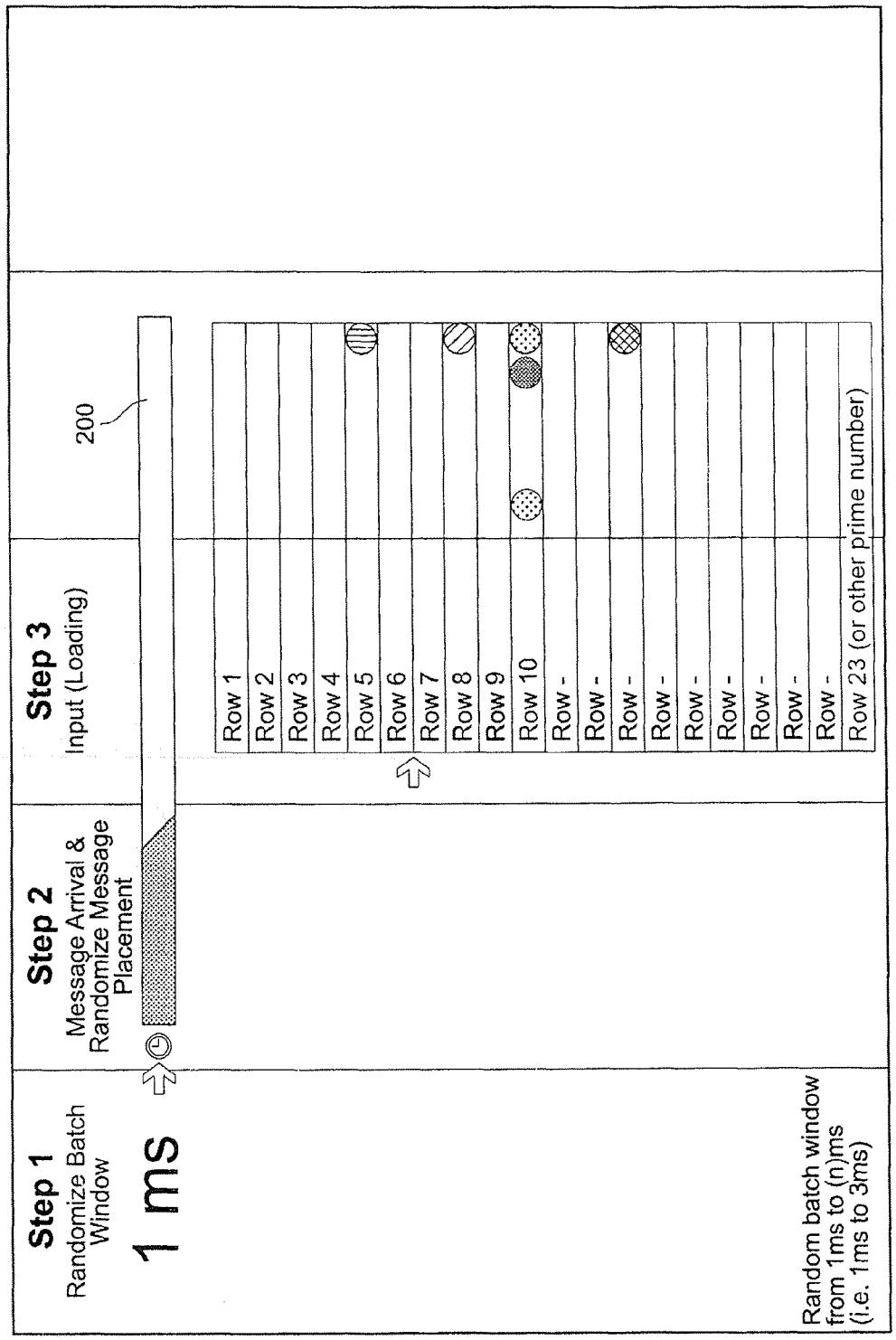
FIGS. 8 to 11 are schematic illustrations showing an embodiment of the present invention and illustrating the stages in the receipt of a batch of orders and their communication to the matching engine.

FIG. 7 shows the core system network with the arbitrators and their associated brokers interconnected by four T1 circuits. A T1 circuit is one which has a maximum data transmission rate of 1.544 megabits per second. Connections between arbitrators and each remote broker is via a distribution network using a pair of T3 or E3 access circuits depending on where the components are located. T3 circuits have a maximum data transmission rate of 44.766 Mbps and are suited to long distance data transmission. An E3 circuit is a European equivalent which is used in countries other than the USA, Japan and Singapore.

Connections between brokers and broker workstations is either via a T1 or E1 circuit based on location or, for older terminals, via a 56 or 64 kb circuit.

In one physical implementation the system comprises a hierarchical distributed network of components interconnected over a high speed network. In one embodiment, this network is a proprietary network. The arbitrators, which host the matching engines and distribute the order books may be HP Itanium Servers provided by Hewlett-Packard Company running an Open VMS operating system. The Broker computers 130, which comprise regional distribution sites may be implemented as IBM 3550 M4 servers using a Linux Operating System. At the access sites, the Ai Servers 150 are typically IBM 3550 M1/2 servers operating on a Linux platform and the trader workstations are any convenient PC such as a Dell Inc, Hewlett-Packard Company CPU running on operating system such as Windows® provided by Microsoft, Inc.

In the past, orders submitted by traders, either manual or automated, are processed by the matching engine in the arbitrator on a price/time priority. That is, in determining in which order to match, each of the arbitrators prioritises those with the best price and then, at that price, matches on the basis or the time at which they were received. It has been recognised the price time priority can lead to an onus on trading parties to invest heavily in high performance technology to ensure that their orders stand the best chance of being executed. Small or even microsecond improvements in order delivery time can result in the difference between a match or a missed trade. As a result, there has been a tendency for participating institutions to engage in an arms race of incremental investment as they see it as essential to succeed on the system. We have appreciated that it would be desirable to eliminate the need for high cost order entry mechanisms and to ensure that fairness of access to the system can be achieved by all participants.

FIGS. 8 to 11 illustrate the way in which the handling of incoming orders is changed to improve fairness. The figures illustrate how orders are received from the brokers and processed by each of the arbitrators. In essence, incoming orders are batched and then submitted to the arbitrator for matching in a randomised order. The arbitrator defines a batch window, typically of a few milliseconds and preferably less than 10 ms and still more preferably 1 to 3 ms. This window size is configurable by the system administrator. Any order message arriving during this interval is stored in a buffer memory at the arbitrator until the window expires. Incoming orders are randomised so that the order in which they are read out of the buffer is different from the order in which they were entered into the system. In this way, the first order received is not necessarily the first that is read out and passed to the arbitrator for matching. Thus, as all incoming orders are delayed for a period of time, there is no longer a premium in ultrafast response and order entry. As mentioned above, although described in realtion to an arbitrator based system, the embodiments of FIGS. 8 to 11 may be used for order entry in any type of trading system.

It is presently preferred to randomise the orders as they are received so that they are stored in a random order. Alternatively, the orders could be stored and then read out in a random order, but this would increase the processing overhead and increase latency.

The process is explained in more detail in FIGS. 8 to 11. At step 1, a random batch window is selected. In this example it is between 1 and 3 ms although this is configurable. Alternatively, the window could have a fixed duration. In FIGS. 8 to 11, the progress of the batch window is indicated by bar 200.

Figure 9:
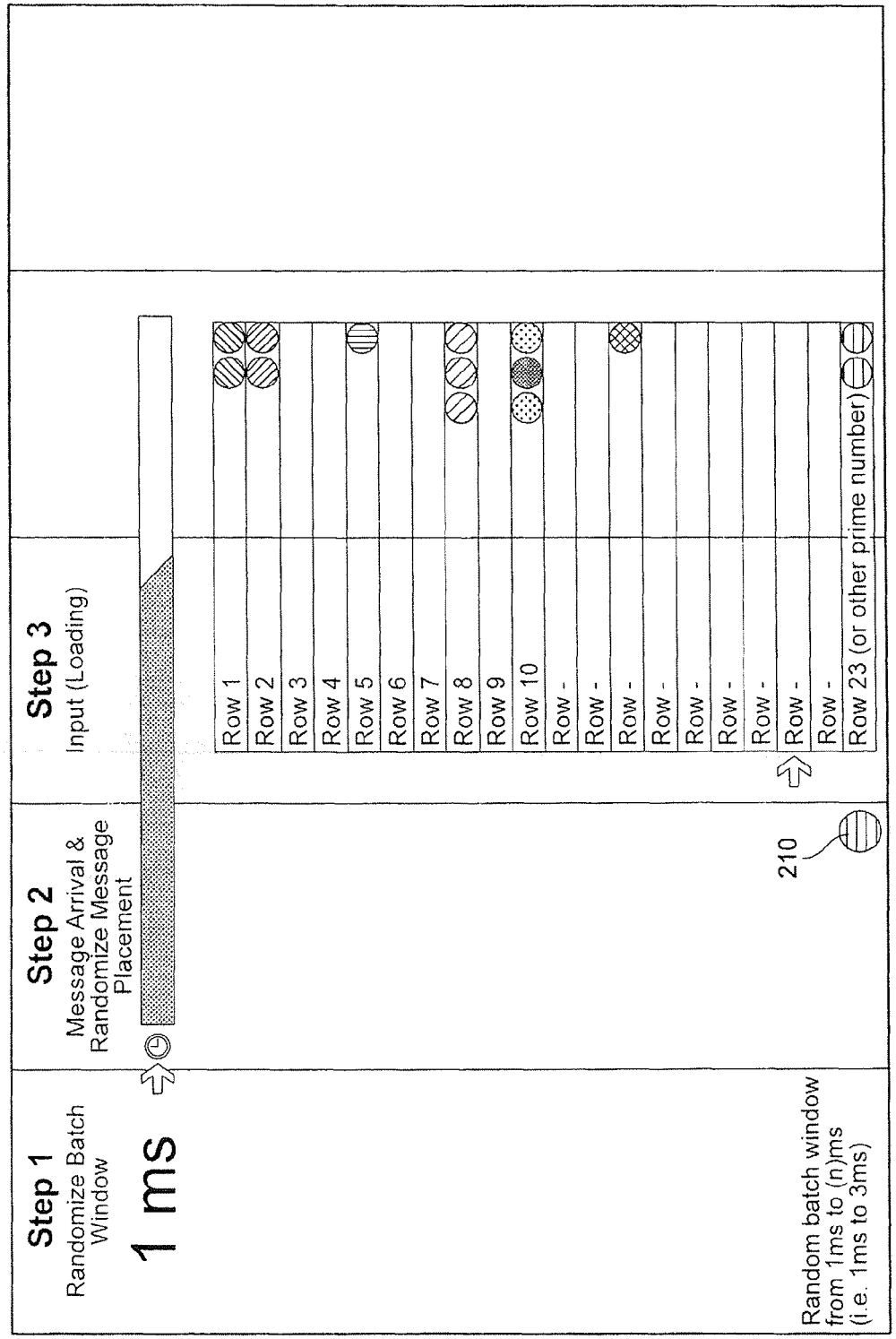

In step 2, order messages are received from participating banks or institutions. An exemplary message is shown at 210. This message is an order to buy or sell at a stated price and may be for a stated amount or a default amount. The order is allocated to one of 1 to n rows or queues in the buffer where N is preferably a prime number. The determination of the row number is performed by a random or pseudo-random process by the arbitrator. FIG. 9 shows how 14 bank messages, or orders, have already been allocated to different queues or rows. It will be noted that several slots have multiple orders from the same bank. These may come from the same or a different trading floor of an institution in the same region, that is the region that inputs orders to the same arbitrator. Orders from the same institution are placed in a queue in the same row so that no institution can gain an advantage or impact others. Thus, in FIG. 9, the orders in each of rows 1, 2, 8, 10 and 23 are from the same institution but not necessarily the same trading floor within the same institution.

Figure 10:
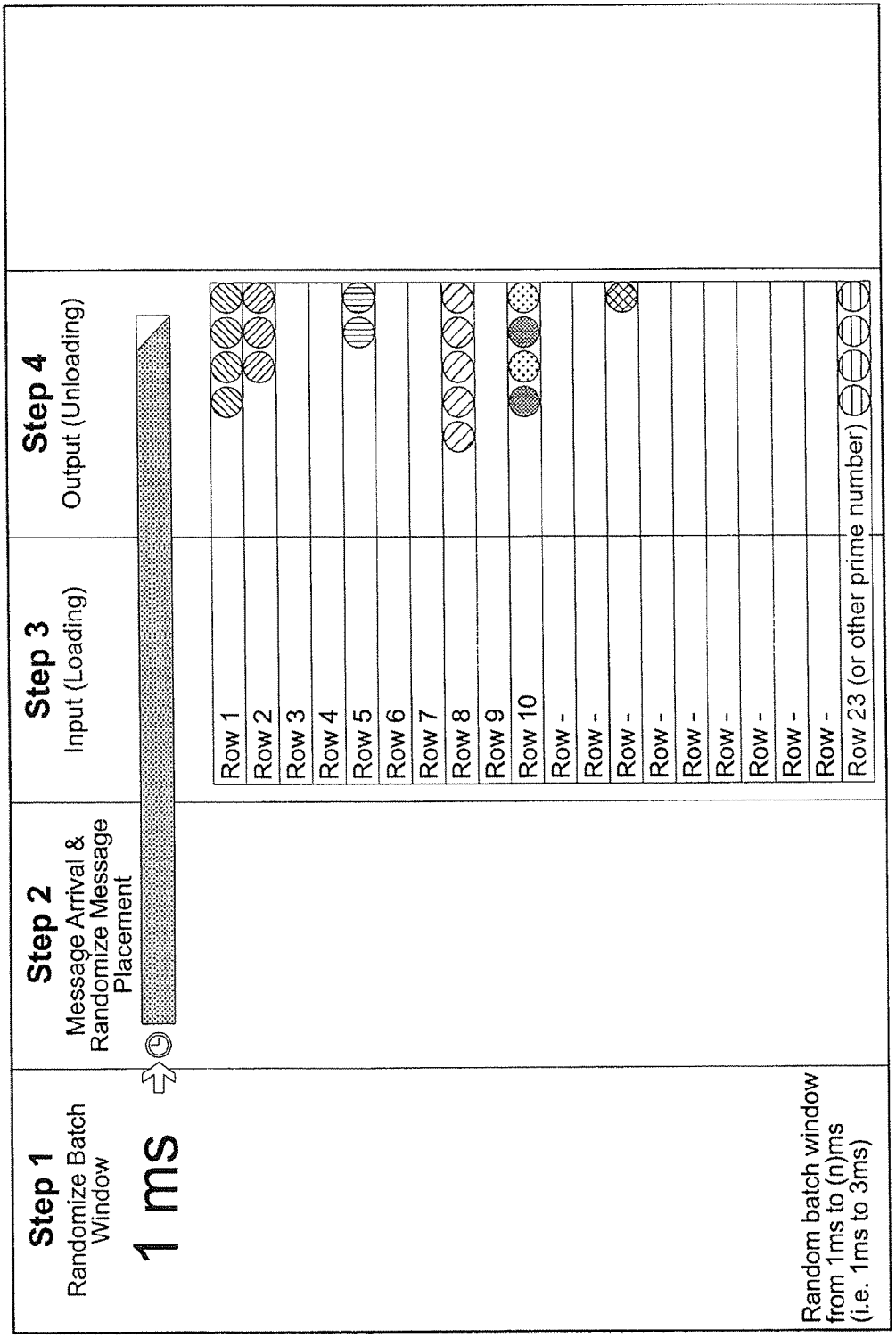
Figure 11:
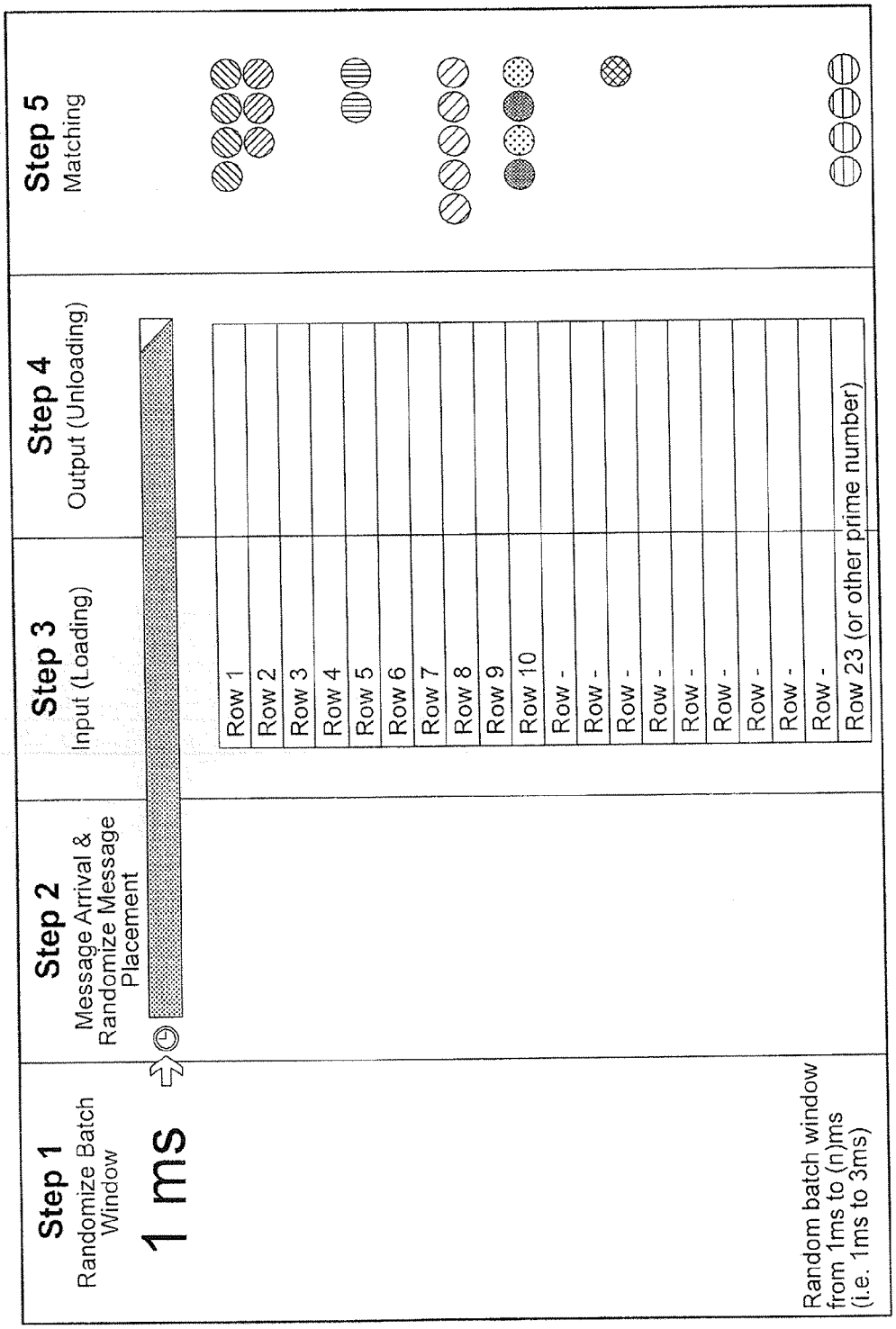
Figure 12:
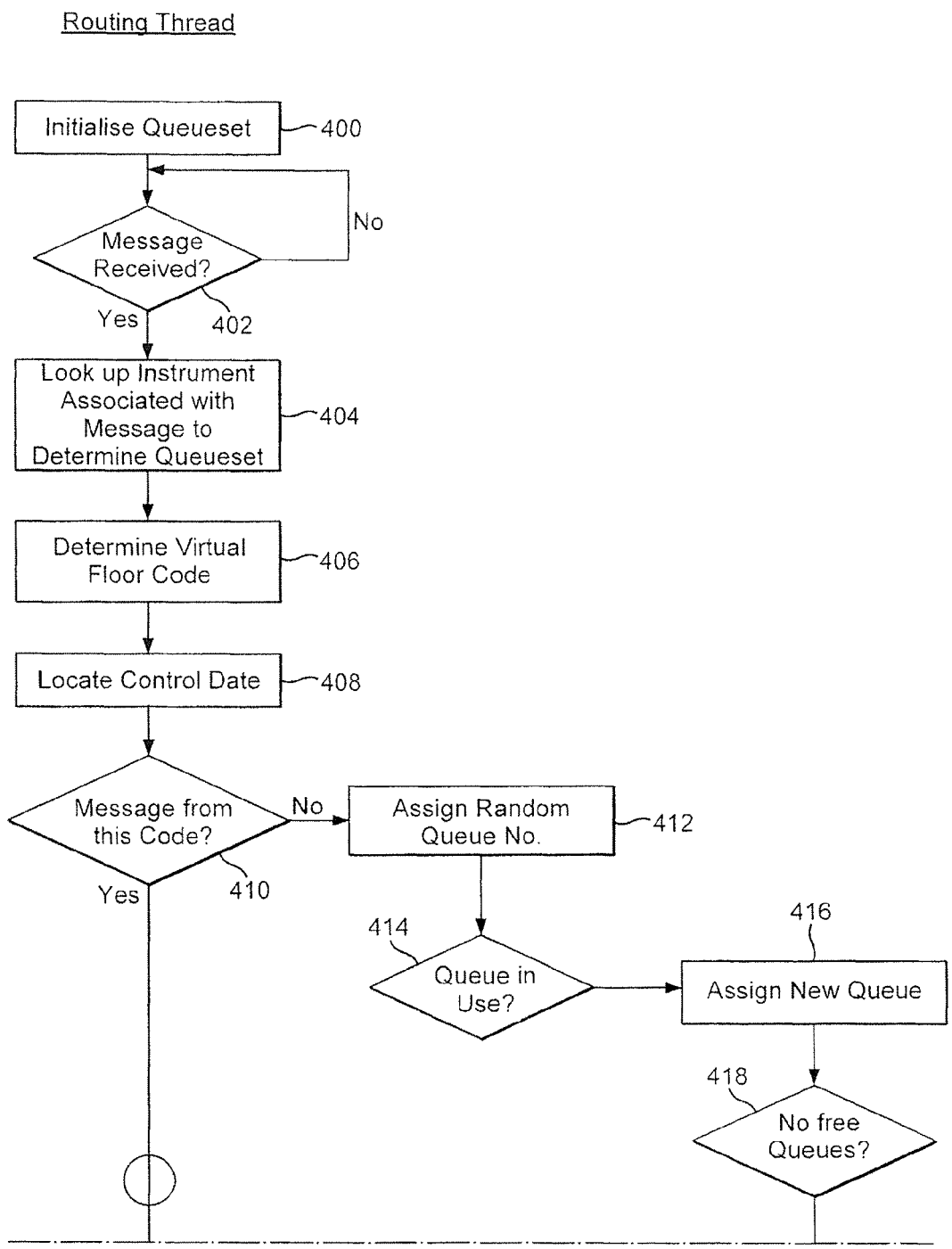
FIG. 12 is a flow chart of the steps of an embodiment of the present invention.
Figure 12:
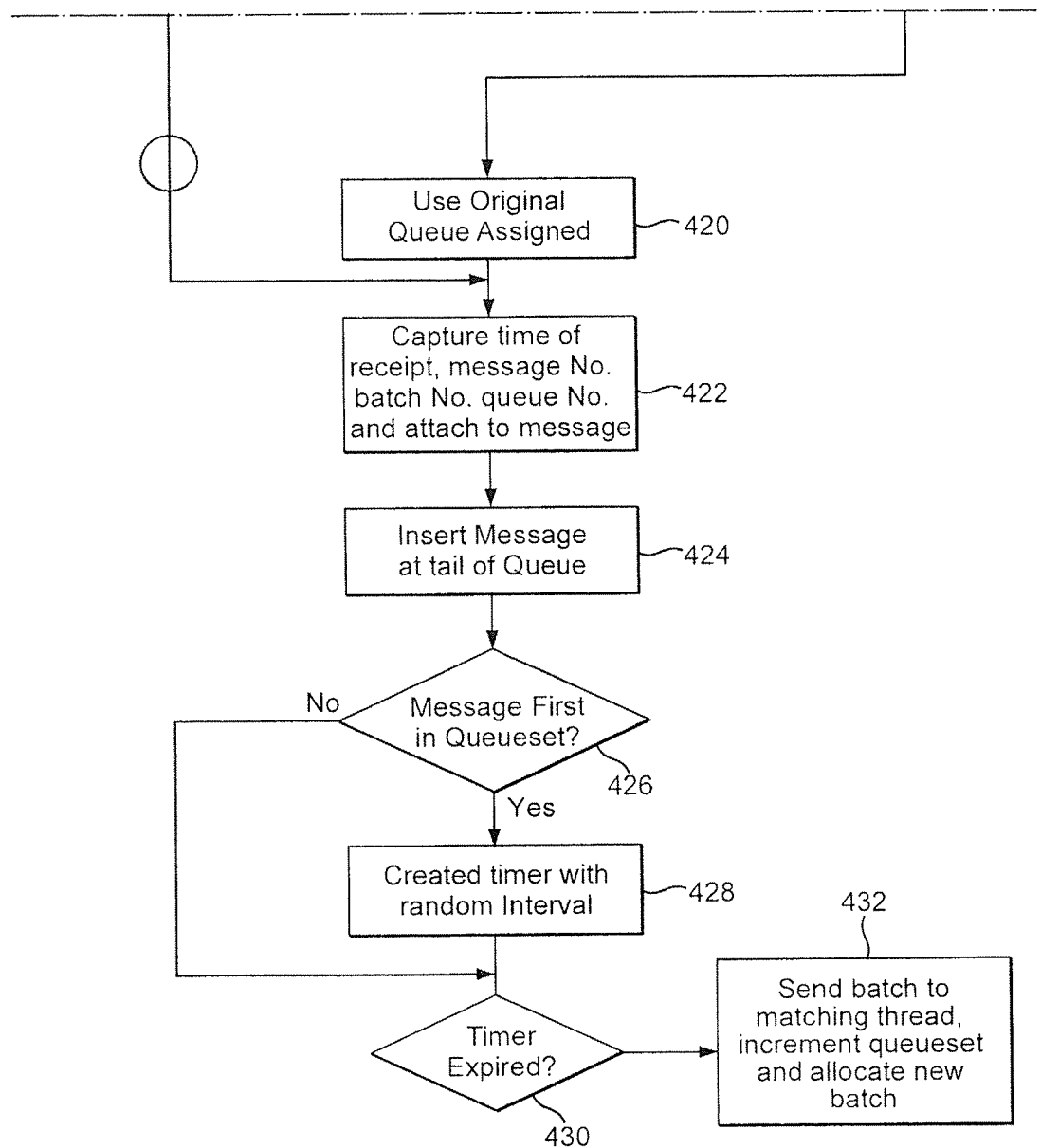

FIG. 10 shows the process of the end of the batch time. There are now seven rows with orders and rows 1, 2, 8, 10 and 23 have more than one order queued from the same institution. The orders in a given row will not necessarily be from the same institutions as the distribution is random, but once a first order has been assigned to a row, all further orders from that institution will be assigned to the same row. As explained in more detail below, it is preferred to assign a fresh message from a new institution to a fresh row but this may not be possible if all rows are occupied. The arbitrator will look at the four letter bank code that forms part of the order and identify the origin of the order. It will then compare that bank code with a record of other bank codes that have been received in that batch window. If it finds a match, it will look up the row number for that bank code for that window and assign the later order to the same row. The manner in which this is done, so that related codes can be identified, is explained below. The trading floors of a bank may share the same bank code, known as a virtual floor code even though their actual floor codes are different. This enables the system to assign orders from different trading floors of the same trading institution to the same row. An example, of this is shown at row 10 where the different shading represents orders from two different trading floors of the same institution FIG. 11 shows how, at the end of the batch window, all orders received are unloaded and passed to the arbitrator for matching. The orders are unloaded in row order, for example, starting with row 1, although this need not be the case. The system unloads the first order from each row, stepping through the rows in sequence, followed by the second order from each row and so on until all rows have been emptied.

It will be appreciated that instead of randomising the rows at entry, orders could be stored in order of receipt and the output order then randomised, although as mentioned above this is not preferred.

It will be appreciated that once orders have been unloaded at step 4, a new window is opened for new orders so that the process is continuous with a new order window opening as the previous one closes.

The embodiment described has not differentiated between order types or instrument types. However, a trading system such as the EBS Spot FX System trades many different instruments, in the case of the EBS platform, many currency pairs, non-deliverable forwards and precious metals. The batch windows may be established for each instrument traded on the system or a batch window may be established for multiple instruments. For example, an arbitrator may operate on continuous batch process for USD:EUR trades and separate and parallel batch processes for each and every other instrument traded on the system.

As explained above, most trades originate from parties attached to the same arbitrator due to the timing of global markets. The batching process applies to all orders that are received at a given arbitrator and is run separately at each arbitrator. However, it will be understood that the batch approach is not confined to distributed trading systems such as the EBS system, but may be used on any system, whether centralised or distributed and where the order submission route is via a public network such as the Internet or a private communications network.

FIG. 13 is a flow chart showing the steps performed by the arbitrator. In one preferred embodiment, the arbitrator uses virtual deal codes to identify trading floor as lined to the same institution. Virtual deal codes are described in U.S. Pat. No. 7,660,760, the contents of which are incorporated herein by reference. A virtual deal code represents a group of real trading deal codes for trading floors of an institution. Thus, an institution XYZ that has trading floors 1XYZ, 2XYZ and 3XYZ may be represented by the virtual code XYZA, when an order message is received from one of these real floors, the arbitrator recognises it as belonging to the XYZA virtual code and ensures that it is assigned to the same slot as messages from other floors having the same virtual code. FIG. 13 shows the steps performed by a routing thread of the arbitrator that is responsible for entry of order messages received from brokers into the arbitrator for matching by a matching thread.

The arbitrators each create a new queue set for each currency pair or other instrument that can be traded on the system. The example of FIGS. 8 to 11 is one queue set formed for order entry of one instrument, for example a currency pair, over one batch window. A routing thread initiates each queue set at 400 by allocating the initial batch. When a message is received at 402, the routing thread at 404 looks up the instrument associated with the message to determine in which queue set to place the message. If the queue set has been disabled, that is the batch interval has been set to zero, the message is queued directly to the arbitrator matching thread. This example shows the steps only for a single instrument for ease of understanding.

At 406, the routing thread then looks up the floor code submitting the message to determine its virtual deal code. The floor identifier, being the trading floor from which the message was sent, is a part of the message received and the arbitrator includes a look-up table in a memory of the relationship between actual floor codes and virtual deal codes.

The routing thread at 408 then locates control data for the virtual floor and queue set to determine at 410 if any messages have been received from this virtual deal code for the batch. If not, the routing thread at 412 chooses a random queue number within the queue set and saves it to be used for future messages from that virtual deal code.

The thread then determines at 414 whether the chosen queue is already in use and is holding any messages. If the randomly chosen queue is already in use with another deal code, the routing thread at 416 looks for an empty queue, starting at the next queue sequentially and cycling through the available queues. If the thread determines at 418 that no empty queue exists it will use, at 420 the initially chosen queue, thus, a given queue number may be used to queue messages from more than one virtual deal code.

At step 422 the routing thread captures the time that the message was received, the message number within the batch, the batch serial number and the queue number and attaches this information to the message. The routing thread then, at step 424 inserts the message at the tail of the selected queue so that it is the last message in the queue.

If it is determined at step 426 that the message is the first sent to the queue set, the routing thread creates a batch timer at step 428 for a random amount of time between the minimum and maximum intervals defined for the queue set. At step 430, the thread determines whether this timer has expired, and if it has the routing thread sends the current batch at step 432, in row order, to the matching thread for matching and then increments the queue set serial number and allocates a new batch. If the message is not the first in the queue set, step 428 is bypassed and the process skips from step 426 to step 430.

At the matching thread of the arbitrator, not shown, when a batch of messages is being received, the thread cycles through all the rows, or queues, repeatedly removing and processing one message from each queue on each pass until all the queues are empty. The matching thread captures the time each message was removed from the batch and appends this time in addition to the information attached by the routing thread to the message and writes the message into a log file. Thus, in the example of FIG. 10, the first message from row 1 is read, followed by the first message from row 2, then the first message from row 5 etc. After the final row, the process steps back to row 1 and reads out the second message in each row sequentially for these rows that have remaining messages.

Once the process has completed, the next batch is initialised and the timer started. The process is continuous.

Thus, embodiments of the invention batch incoming messages which are then transferred to the matching thread of the arbitrator in a random manner. This de-emphasises the need for highly sophisticated systems for ensuring the fastest possible order submission from the trading floors to the system and so increasing fairness of access by increasing the likelihood that smaller participants will have their orders matched even if they were submitted using less sophisticated systems than orders submitted by larger institutions.

Various modifications to the embodiments described are possible and will occur to those skilled in the art without departing from the spirit and scope of the invention.

The invention claimed is:

1. A computerized method for submission of orders to an electronic trading system for matching, the method comprising:
    initiating, at a server, a batch having a defined duration, the batch comprising a set of queues;
    receiving, at the server, electronic order messages for trading an instrument from parties trading on the electronic trading system;
    assigning each respective received order message to a random queue within the set of queues; and
    at the end of the defined duration of the batch, transferring the assigned order messages sequentially from each queue to a matching function of the electronic trading system.

2. A method according to claim 1, wherein each respective received order message includes an indication of the identity of the party from whom the respective order message was received and wherein the method further comprises determining, at the server, a virtual floor code of the party from whom the respective order message was received, the virtual floor code identifying a group of related parties trading on the system.

3. A method according to claim 2, comprising, with respect to a newly received electronic order message, comparing the virtual floor code of the newly received order message with the virtual floor codes of any previously received order messages which have already been assigned to queues of the batch, and, if the virtual floor code of the newly received order message matches any of the virtual floor codes of the previously received order messages, assigning the newly received order message to the same queue as the previously received order message having the same virtual floor code.

4. A method according to claim 3, wherein when the newly received order message is assigned to the same queue as the previously received order message having the same virtual floor code at a position behind the previously received order message such that the previously received order message is sent to the matching function before the newly received order message is sent to the matching function.

5. A method according to claim 1, wherein the process of assigning each respective received order message to a random queue comprises selecting a proposed random queue for the respective order message and if the proposed random queue already has an order message assigned to it, assigning the respective order message to a next empty queue.

6. A method according to claim 5, wherein, for each respective order message, in the absence of any empty queues, the respective order message is assigned to the proposed random queue.

7. A method according to claim 1, comprising attaching order message information to each respective order message after it has been assigned to a random queue.

8. A method according to claim 7, wherein the order message information includes at least one of a batch number, an order message time of receipt, an order message number within the batch and an assigned queue number.

9. A method according to claim 1, wherein, for each of the received order messages, if the respective received order message is the first order message received in a batch, initiating a timer having the defined duration of the batch.

10. A method according to claim 1, wherein the sever has a routing thread which performs the initiating, receiving and assigning operations and the server also has a matching thread that cycles through the queues to transfer the assigned order messages sequentially from each of the queues to the matching function of the electronic trading system.

11. A method according to claim 10, wherein the matching thread adds a time at which an order message was removed from the batch to the message.

12. An electronic trading system for submission of orders to trade instruments for matching, the system comprising an order entry system including:
  a server configured to initiate a batch having a defined duration, the batch comprising a set of queues and relating to an instrument of a plurality of instruments traded on the electronic trading system;
  the server being configured to receive, electronic order messages for trading the plurality of instruments from parties trading on the electronic trading system;
  the server being configured to assign respective received order messages to the batch to which the instrument relates and, for each respective received order message to a respective random queue within the set of queues; and
  the server further being configured to transfer the assigned order messages, at the end of the defined duration of the batch, sequentially from each queue of the set of queues to a matching function of the electronic trading system.

13. An electronic trading system according to claim 12, wherein each respective received order message includes an indication of the identity of the party from whom the respective order message was received, the server being further configured to determine a virtual floor code of the party from whom the respective order message was received, the virtual floor code identifying a group of related parties trading on the system.

14. An trading system according to claim 13, wherein the server is configured to compare the virtual floor code of a newly received order message with the virtual floor codes of any previously received order messages which have already been assigned to queues of the batch and, if the virtual floor code of the newly received order message matches any of the virtual floor codes of the previously received order message, assigning the newly received order message to the same queue as the previously received order message having the same virtual floor code.

15. An electronic computerized trading system according to claim 14, wherein the server is configured to assign the newly received order message to the same queue as the previously received order message having the same virtual floor code at a position behind the previously received order message such that the previously received order message is sent to the matching function before the newly received order message is sent to the matching function.

16. An electronic computerized trading system according to claim 12, wherein the server is configured to assign each respective received order message to a random queue by first selecting a proposed random queue for the respective order message and, if the proposed random queue already has an order message assigned to it assigning the respective order message to a next empty queue.

17. An electronic trading system according to claim 16, wherein for each respective order message, in the absence of any empty queues the respective order message is assigned the proposed random queue.

18. An electronic trading system according to claim 12, wherein the server is configured to attach order message information to each respective order message after it has been assigned to a queue.

19. An electronic trading system according to claim 18, wherein the order message information includes at least one of a batch number, an order message time of receipt an order message number within the batch, and an assigned queue number.

20. An electronic trading system according to claim 12, wherein for each respective received order message, if the received message is the first order message received in the batch, initiating a timer having the defined duration of the batch.

21. A non-transitory tangible computer readable medium comprising computer-executable instructions that, when executed on an electronic trading system, causes the electronic trading system to:
  initiate a batch having a defined duration, the batch comprising a set of queues:
    receive electronic order messages for trading an instrument from parties trading on the electronic trading system;
    assign each received order message to a respective random queue within the set of queues; and
    at the end of the defined duration of the batch, sequentially transferring each of the order messages from each of the queues to a matching function of the electronic trading system.

22. A non-transitory tangible computer-readable medium according to claim 21, wherein the electronic trading system includes a server having a routing thread which performs the initiating, receiving and assigning operations and the sever also having a matching thread that cycles through the queues to transfer the assigned order message sequentially from each of the set of queues to the matching function of the electronic trading system.

23. A non-transitory tangible computer-readable medium according to claim 22, wherein the matching thread adds the time at which a message was removed from the batch to the message.

* * * * *